United States Patent
Klein et al.

(10) Patent No.: US 7,603,494 B2
(45) Date of Patent: Oct. 13, 2009

(54) HOME NETWORKING RESOURCE MANAGEMENT

(75) Inventors: Adam Lee Klein, Cedar Park, TX (US); Jamie Fisher, Austin, TX (US); James Bert Grantges, Austin, TX (US); James L. Cansler, Jr., Pflugerville, TX (US); Lona Noelle Dallessandro, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 254 days.

(21) Appl. No.: 11/029,638

(22) Filed: Jan. 5, 2005

(65) Prior Publication Data

US 2006/0150244 A1 Jul. 6, 2006

(51) Int. Cl.
*G06F 3/00* (2006.01)
*G06F 9/46* (2006.01)

(52) U.S. Cl. .............................. 710/36; 710/8; 710/40; 709/227; 726/12; 726/27; 718/104; 719/313

(58) Field of Classification Search ........................ None
See application file for complete search history.

(56) References Cited

U.S. PATENT DOCUMENTS

| | | | |
|---|---|---|---|
| 5,396,546 A | 3/1995 | Remillard | |
| 5,561,708 A | 10/1996 | Remillard | |
| 6,167,120 A * | 12/2000 | Kikinis | ..................... 379/90.01 |
| 6,246,409 B1 * | 6/2001 | Veghte et al. | ................ 345/356 |
| 6,501,995 B1 | 12/2002 | Kinney et al. | |
| 6,587,835 B1 * | 7/2003 | Treyz et al. | .................... 705/14 |
| 6,694,387 B2 | 2/2004 | Wagner | |
| 6,745,259 B2 | 6/2004 | Wagner | |
| 6,788,980 B1 | 9/2004 | Johnson | |
| 6,907,476 B2 | 6/2005 | Wagner | |
| 2001/0007133 A1 * | 7/2001 | Moriconi et al. | ............ 713/201 |
| 2001/0034759 A1 * | 10/2001 | Chiles et al. | ................ 709/203 |
| 2002/0188735 A1 * | 12/2002 | Needham et al. | ............ 709/229 |
| 2005/0144286 A1 * | 6/2005 | Szu et al. | ..................... 709/227 |

\* cited by examiner

*Primary Examiner*—Eron J Sorrell
*Assistant Examiner*—Dean Phan
(74) *Attorney, Agent, or Firm*—Toler Law Group

(57) ABSTRACT

In a particular embodiment, the disclosure is directed to a method of configuring a computer coupled to a residential gateway. The method includes executing resource sharing software on the computer, receiving a message from the residential gateway requesting identification of available resources of the computer, and sending a response message to the residential gateway. The response message identifies a set of available resources of the computer. The method further includes receiving access settings corresponding to each of the set of available resources and configuring the computer to provide access to each of the set of available resources in accordance with the access settings.

24 Claims, 3 Drawing Sheets

HOME NETWORKING RESOURCE MANAGEMENT

FIELD OF THE DISCLOSURE

The present disclosure relates to a method and system of configuring networked computer devices.

BACKGROUND

With conventional computer networks, resource sharing (for example, a file system or hard drive) had to be configured on individual computers. Also, the operating system of each computer would have to be separately configured to allow access to files or groups of files. This process can be complicated and requires technical knowledge of how to configure a network to selectively allow access to files on other computers or devices.

Some systems have required installing a single piece of software on a computer and configuring the software on the computer to share certain groups of files to other computers. For example, a piece of software may be installed on a personal computer (PC) that exposes media content on the PC to a set top box so that the set top box has access to the media files. While such software techniques address certain issues, they still require the configuration of files to be performed on each separate personal computer in the network.

Accordingly, there is a need for an improved system and method for configuring networked computers.

DETAILED DESCRIPTION OF THE DRAWINGS

In a particular embodiment, the present disclosure is directed to a method of configuring resources of configurable devices coupled to a residential gateway. The method includes displaying a list of configurable devices accessible to the residential gateway, selecting a device from the list of configurable devices, and sending a request message to view available resources. The request message is sent from the residential gateway to the selected device. The method further includes receiving a response message at the residential gateway from the selected device where the response message identifies a set of available resources of the selected device. The method further includes identifying sharing properties with respect to the selected device and the other configurable devices for each of the set of available resources of the selected device and sending a message identifying the sharing properties from the residential gateway to the selected device.

In another embodiment, the disclosure is directed to a method of configuring a computer coupled to a residential gateway. The method includes executing resource sharing software on the computer, receiving a message from the residential gateway requesting identification of available resources of the computer, and sending a response message to the residential gateway. The response message identifies a set of available resources of the computer. The method further includes receiving access settings corresponding to each of the set of available resources and configuring the computer to provide access to each of the set of available resources in accordance with the access settings.

Figure 1:
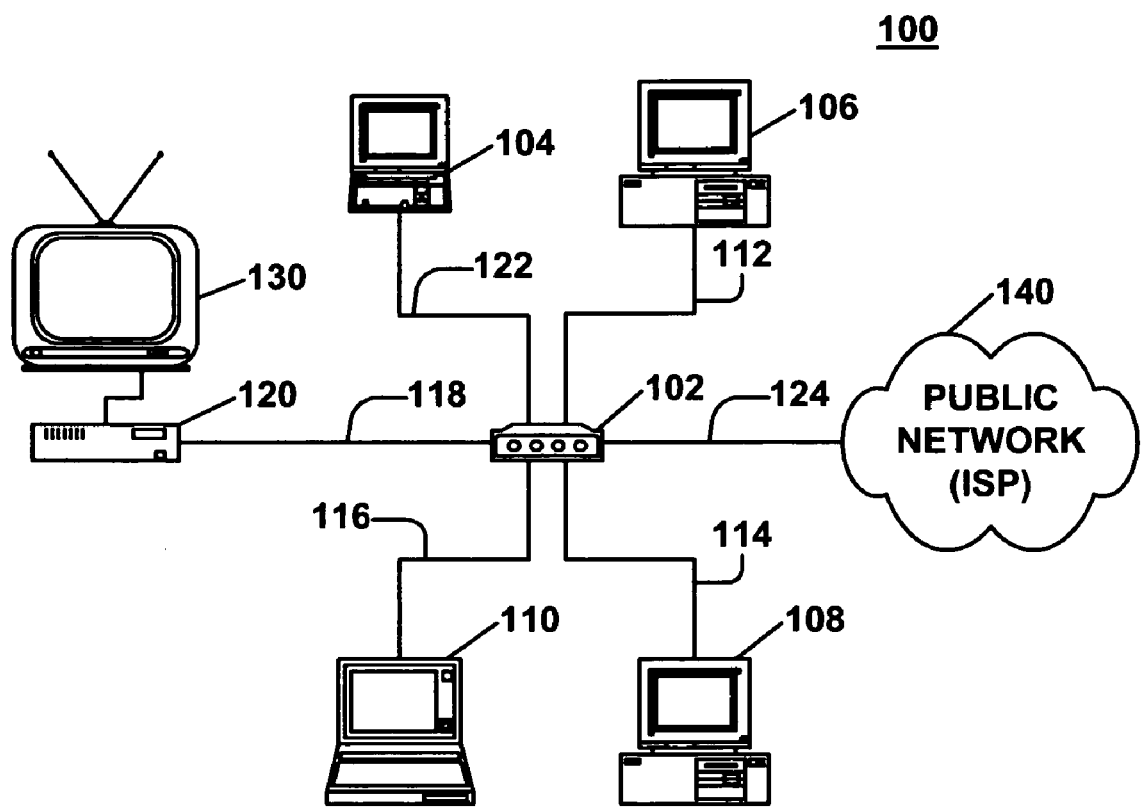
FIG. 1 is a general diagram that illustrates a system of configuring networked computer devices.

Referring to FIG. 1, a home network system 100 is shown. The home network system 100 includes a residential gateway 102 that is coupled to an internet service provider (ISP) 140 via a wide area network interface 124. The residential gateway 102 has a first interface 112 that is coupled to a first configurable computer device 106. The residential gateway 102 also includes a second interface 118 that is coupled to a set top box 120. The residential gateway 102 also includes further interfaces, such as a third interface 116 that is coupled to a portable computer 110, and a fourth interface 114 that is coupled to a second desktop computer 108. The residential gateway 102 may include additional interfaces, such as a fifth interface 122 that is coupeld to another type of portable computer 104.

As shown in FIG. 1, the set top box 120 is coupled to a display such as television 130. In a particular embodiment, each of the devices coupled to the residential gateway 102 are configurable by the residential gateway 102. Further, each of these end computer devices include resource sharing software that communicates with the residential gateway 102 and that provides for configuration of file and device sharing properties. In an illustrative embodiment, the residential gateway 102 may be a router, a home gateway, or a DSL modem. Moreover, the residential gateway 102 may be coupled via the internet service provider 140 to a distributed public computer network, such as the Internet.

In a particular embodiment, as depicted in FIG. 1, the residential gateway 102 is employed in a home network system 100. As part of an installation process, a customer can install resource sharing software on each of the computer devices in the home network system 100. This resource sharing software allows for communication between the gateway 102 and each of the network devices for configuration purposes. To allow one device, such a laptop with a wireless connection to access the network, a physical connection or a wireless connection from the laptop to the gateway is established. In the case of a wireless connection, wireless security and access control can be handled by the gateway 102 for access to the home network system 100. Once a device is authorized to be on the network, the device may be considered trusted because it either has a physical connection or has passed the security credentials to gain access to the secured wireless network.

Since devices on the home network system 100 are considered trusted, the gateway 102 can act as a primary access point to configure or allow/deny access to files or other resources of each of the devices in the home network system 100. For example, a customer may log into an interface on the residential gateway 102 that shows all the resources available for sharing to other devices on the home network system 100. The gateway 102 can then allow or deny access to each of the individual devices on the network or may have a default that allows sharing of resources across all trusted devices on the network. The resource sharing software communicates with the gateway 102 to enable resource sharing. With a mechanism that is controlled by the residential gateway 102 to prevent unauthorized access, the devices attached to the home network system 100 can be considered trusted devices and the gateway 102 can manage sharing of resources on the home network system 100.

The home network system 100 allows the management of shared files or resources to be handled at a centralized location so that configuration does not have to be performed on each separate computer device on the home network system 100. The home network system 100 allows configuration of the various computers on a local area network (LAN) and provides access between the computers for sharing files at a centralized location, using the residential gateway 102.

Figure 2:
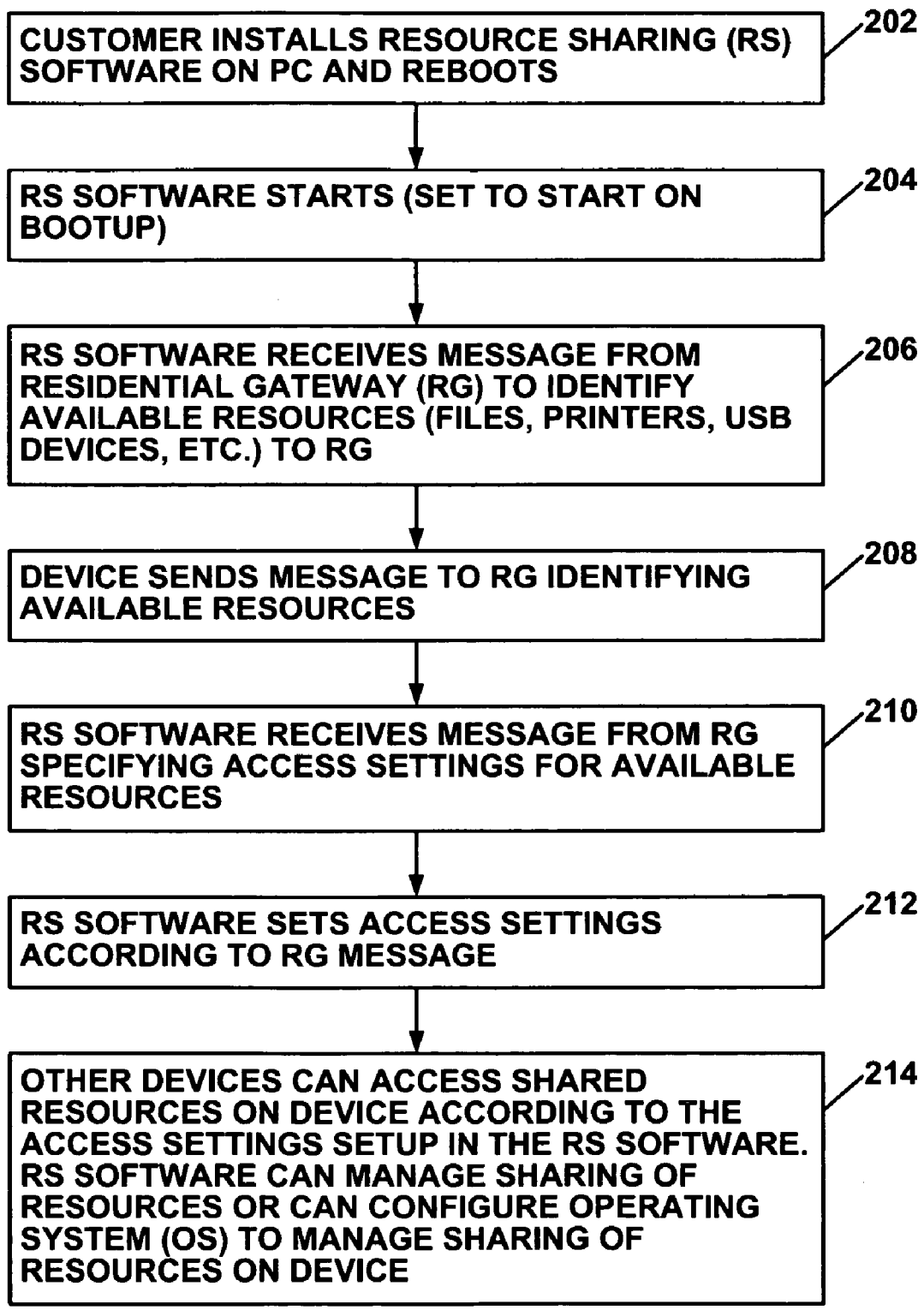
FIG. 2 is a flow chart that illustrates a method of configuring resources on a networked computer device.

Referring to FIG. 2, a method of installing and utilizing resource sharing software on a configurable device coupled to a local network is shown. The method includes installing the resource sharing software on a networked device, such as a personal computer and performing a re-boot of the computer, as shown at 202. The method further includes executing the resource sharing software, such as automatically executing the resource sharing software upon boot-up of a computer device or a set top box, as shown at 204. The method further includes receiving a message at the resource software from a residential gateway 102.

In a particular embodiment, as shown at 206, the message received is a request to identify available resources at the computer device. An example of available resources include data files, image files, printers, USB devices, and other peripheral devices available to the end computer device. While reference has been made to a personal computer and to a set top box, it should be understood that any end device having a processor and memory that is configurable by the residential gateway 102 may be accessed by the residential gateway 102 utilizing the resource sharing software.

As illustrated in FIG. 2, the method further includes sending a message from the configurable computing device to the residential gateway 102, as shown at 208. In a particular embodiment, the message sent identifies the available resources of the configurable device, as shown at 208. At 210, the resource sharing software at the configurable device receives a response message from the residential gateway 102 that specifies a permitted access setting for each of the identified available resources. An example of a permitted access setting includes a global permission that allows particular available resources to be shared among all devices that are coupled to the residential gateway 102. Another example of an access setting includes a restricted setting that allows no sharing of the particular available resource. In another embodiment, an access setting may identify selected devices appropriate for resource sharing and other devices that are accessible to the residential gateway 102 where no sharing is permitted.

The resource sharing software sets access settings on the computer device according to the residential gateway 102 message settings, at 212. The resource sharing software may set the access settings by configuring the configurable computing device. After implementing the access settings, other configurable devices coupled to the residential gateway 102 can access shared resources on such devices according to the access settings as configured by the resource sharing software, at 214. The resource sharing software can manage the sharing of resources or can configure the computing device operating system to manage sharing of resources on such device.

Thus, the present disclosure provides a method and system of conveniently configuring and implementing resources sharing and access settings on a variety of different end computing devices and set top boxes using a centralized residential gateway 102 system. With a centralized residential gateway, preferably via a remote internet web-based interface, a user may conveniently and easily update access settings for multiple devices within a residential network. In addition, since each of the configurable devices are trusted and have been authenticated by physical access or secured wireless access to the residential gateway 102, convenient resource sharing may be implemented.

Figure 3:
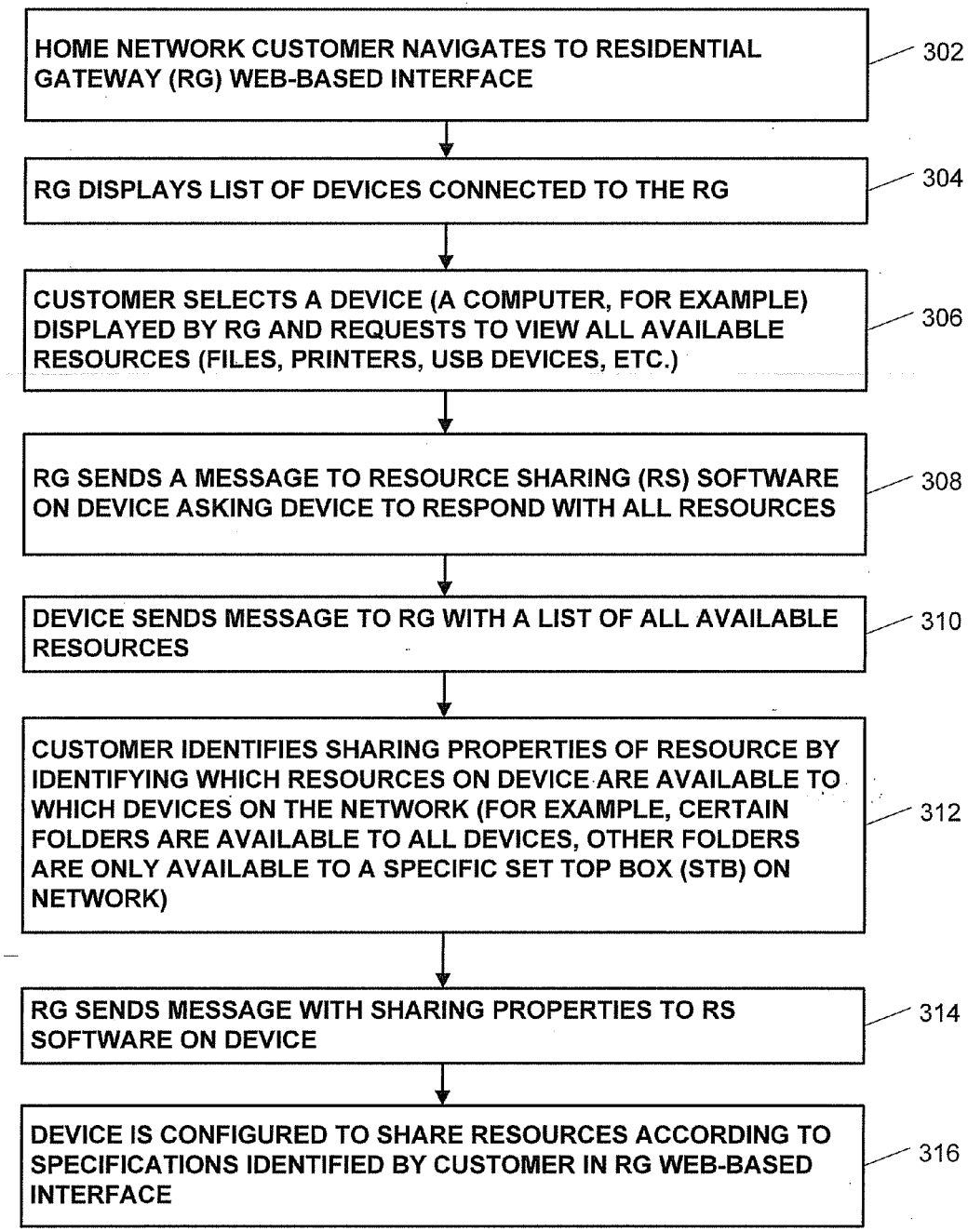
FIG. 3 is a flow chart that illustrates a method of configuring resources and using a centralized residential gateway.

Referring to FIG. 3, a method of communicating access settings and configuring a plurality of end devices coupled to a residential gateway 102 is shown. The method includes navigating via a distributed network, such as via a web-based interface, to a residential gateway, at 302. The residential gateway 102 displays a list of devices that are connected to the residential gateway, at 304. A customer selects a device to be configured from the list of devices displayed by the residential gateway 102 and requests to view the available resources on the selected device, as shown at 306. An example of available resources include files, printers, USB devices, and other peripherals.

As depicted in FIG. 3, the residential gateway 102 sends a request message to resource sharing software on the selected device seeking information regarding available resources, at 308. The configurable device, via the resource sharing software, sends a response message to the residential gateway with a list of the available resources, at 310. The customer identifies sharing properties of each of the available resources and defines those selected resources available for sharing on the network, at 312. For example, certain folders may be available to all devices and other folders may only be available to a specific device, such as to a set top box on the network. The residential gateway 102 sends an access priority message that provides the identified sharing properties to the resource sharing software on the selected device, at 314. Next, at 316, the configurable network device is configured based on the communicated sharing properties. The configurable device then shares resources according to the access specifications identified by the customer and communicated via the residential gateway web-based interface to the networked computing devices.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:

receiving, at a residential gateway, data indicating a selection of a device from a list of all configurable devices coupled to the residential gateway;

sending a request message to view all available resources of the selected device, the request message sent from the residential gateway to the selected device;

receiving a response message at the residential gateway from the selected device, the response message identifying all available resources of the selected device;

specifying, at the residential gateway, sharing properties with respect to the selected device and the other configurable devices for each of the available resources of the selected device, wherein the sharing properties identify one or more resources of the available resources of the selected device that are available to other configurable devices; and sending a message identifying the sharing properties from the residential gateway to the selected device to enable the selected device to configure resources of the selected device to have the specified sharing properties, wherein the sharing properties identify a first group of the available resources that is permitted access to all configurable devices coupled to the residential gateway and a second group of the available resources that is only permitted access to a specific set-top box coupled to the residential gateway.

2. The method of claim 1, wherein the selected device is configured to share the available resources based on the sharing properties.

3. The method of claim 1, wherein a display of the list of all configurable devices is accessible via a web-based interface.

4. The method of claim 1, wherein a first of the configurable devices is a set top box and a second of the configurable devices is a personal computer.

5. The method of claim 4, wherein the set top box is coupled to the residential gateway over a local area network and the personal computer is coupled to the residential gateway over the local area network.

6. The method of claim 5, wherein the residential gateway has an interface to a public computer network.

7. The method of claim 6, wherein the residential gateway is coupled to the Internet via an internet service provider.

8. The method of claim 4, wherein a third of the configurable devices is a laptop computer.

9. The method of claim 8, wherein the selected device is the personal computer and wherein the sharing properties further identify a group of the available resources that are assigned a global sharing property that allows sharing to the set top box and to the laptop computer and another group of the available resources that has a restricted sharing property.

10. The method of claim 9, wherein the restricted sharing property does not permit any sharing.

11. The method of claim 1, wherein the available resources includes files and peripheral devices.

12. The method of claim 11, wherein the peripheral devices are selected from the group of a printer, a scanner, and a USB device.

13. A method of configuring a computer coupled to a residential gateway, the method comprising:
executing resource sharing software on the computer;
receiving a message from the residential gateway requesting identification of all available resources of the computer;
sending a response message to the residential gateway, the response message identifying all available resources of the computer;
receiving access settings from the residential gateway corresponding to each of the available resources; and
configuring the computer to provide access to each of the available resources in accordance with the access settings, wherein the access settings identify which ones of the available resources of the computer are permitted access by other configurable devices coupled to the residential gateway, wherein the access settings determine access for all configurable devices accessible to the residential gateway,
wherein the access settings identify a first group of the available resources of the computer that is permitted access to all configurable devices coupled to the residential gateway and a second group of the available resources of the computer that is only permitted access to a specific set-top box coupled to the residential gateway.

14. The method of claim 13, further comprising installing the resource sharing software on the computer prior to executing the resource sharing software.

15. The method of claim 13, wherein the access settings indicate that global access is to be provided to a set of files and wherein the set of files are sharable with a set top box coupled to the residential gateway.

16. The method of claim 13, wherein an operating system on the computer is configured to manage sharing of the available resources in accordance with the access settings.

17. A residential gateway comprising:
a first interface to a first configurable device;
a second interface to a second configurable device;
a network interface to an external network;
a processor responsive to the first interface, the second interface, and to the network interface, wherein the processor includes user interface logic to:
communicate a list of all configurable devices accessible to the residential gateway, the list of all configurable devices including the first configurable device and the second configurable device; and
select a device from the list of all configurable devices, wherein the selected device is the first configurable device; and
wherein the processor further includes communication logic to:
send a request message to request all available resources over the first interface to the first configurable device;
receive a response message from the first configurable device, the response message identifying all available resources of the first configurable device; and
send a message to specify sharing properties assigned to each of the available resources, the sharing properties sent to the first configurable device, wherein the sharing properties identify which ones of the available resources of the first configurable device are available to other configurable devices coupled to the residential gateway,
wherein the sharing properties identify a first group of the available resources that is permitted access to all configurable devices coupled to the residential gateway and a second group of the available resources that is only permitted access to a specific set-top box coupled to the residential gateway.

18. The residential gateway of claim 17, wherein the sharing properties identify sharing of access between the first configurable device and at least the second configurable device.

19. The residential gateway of claim 18, wherein the first configurable device is a computer and the second configurable device is a set top box.

20. The residential gateway of claim 17, wherein the first configurable device is a trusted device on a local network coupling the first interface to the first configurable device and wherein the second configurable device is a trusted device on the local network further coupling the second interface to the second configurable device.

21. The residential gateway of claim 20, wherein the first configurable device is physically connected to the first interface and the second configurable device is physically connected to the second interface.

22. The residential gateway of claim 20, wherein the first configurable device is coupled to the first interface over a secure wireless connection.

23. The residential gateway of claim 17, wherein the communication logic includes authentication logic to authenticate communications between the first interface and the first configurable device.

24. The residential gateway of claim 23, wherein the authentication logic authenticates communications between the second interface and the second configurable device.

* * * * *